Oct. 11, 1932.  D. C. PAGE ET AL  1,881,905

CHUCK

Filed June 5, 1931  2 Sheets-Sheet 1

Inventors
Dwight C. Page
Gherald D. Scott
By Geo. H. Kennedy Jr.
Attorney

Oct. 11, 1932.  D. C. PAGE ET AL  1,881,905
CHUCK
Filed June 5, 1931  2 Sheets-Sheet 2

Inventors
Dwight C. Page
Gherald D. Scott
By
Geo. H. Kennedy Jr.
Attorney

Patented Oct. 11, 1932

1,881,905

UNITED STATES PATENT OFFICE

DWIGHT C. PAGE AND GHERALD D. SCOTT, OF WORCESTER, MASSACHUSETTS, ASSIGNORS TO THE HEALD MACHINE COMPANY, OF WORCESTER, MASSACHUSETTS, A CORPORATION OF MASSACHUSETTS

CHUCK

Application filed June 5, 1931. Serial No. 542,290.

The present invention relates to an improvement in work-holding devices or chucks and more especially to chucks which are adapted for holding annular or hollow workpieces in position to permit a grinding or similar operation to be performed on the internal bore of the workpiece.

The particular utility of the invention is in holding workpieces having exterior cylindrical or conical surfaces; each workpiece is automatically centered with reference to its external surface and clamped by end pressure in such position so that when the bore of the workpiece is ground to the desired diameter, it will be concentric with the exterior surfaces.

In the copending application Serial No. 174,940, filed by Page, one of the present applicants, and Jellicoe, now Patent No. 1,812,017, issued June 30, 1931, a plurality of centering fingers are urged into engagement with the workpiece, to center said workpiece, in response to movement of an operating rod and continued movement of said rod urges clamping members against the workpiece to hold said workpiece, the pressure exerted on the workpiece by the centering fingers is increased by this latter movement so that, especially in workpieces of small cross-sectional area, the pressure of the centering fingers tends to distort said workpieces to a slight extent. It is one of the objects of the present invention to avoid the distortion and, according to the present invention, a set of centering fingers is arranged to be urged into engagement with the workpiece in order to center the workpiece in relation with the surface and, after the workpiece has been clamped, the centering fingers are withdrawn from engagement with the workpiece, thereby to avoid any tendency of the centering fingers to distort the workpiece.

When the draw rod of the chuck is actuated by fluid under pressure, as shown for example in the copending application of Highberg Serial No. 99,287, filed April 2, 1926, now Patent 1,840,841, issued January 12, 1932, the variations in fluid pressure make it difficult to maintain a constant tension on the draw rod. The resulting variations in tension on the draw rod cause variations in the clamping pressure exerted by the clamping members of the chuck, which tend to distort the workpiece clamped thereby, with the result that the grinding action on the workpiece is not uniform. In chucks of the type shown in the above identified Page and Jellicoe application, this variable tension on the draw rod varies the pressure of both the clamping members and the centering members against the workpiece. Another object of the present invention is to provide a chuck having the the advantages of the above constructions but none of the disadvantages.

In the grinding of a workpiece a considerable amount of heat is generated, thereby causing the workpiece to expand and, if the centering fingers are left in contact with the workpiece during the grinding operation, the workpiece cannot expand evenly whereby the ground surface of the workpiece is uneven when the workpiece is released from the chuck and is cooled to the normal temperature. It will be readily understood that when a workpiece is held radially by a plurality of immovable members and the workpiece becomes heated as a result of the grinding operation, the portions of the workpiece between the members will expand radially and the portions adjacent the members will be held against radial movement by said members so that the workpiece is distorted during the greater portion of the grinding operation. As the workpiece cools to normal temperature after removal from the chuck, the said workpiece resumes its normal size and shape, with the result that the sections which were adjacent the holding members become low spots in the finished surface of the bore, more material having been removed at these points during the grinding operation. Although the expansion of a workpiece during the grinding is very slight, it is nevertheless, great enough to cause objectionable low spots in the finished surface unless the radial holding fingers are removed from contact with the workpiece during the grinding operation. It is accordingly a further object of our invention to provide a chuck in which the radial centering or clamping fingers are removed from contact with the workpiece during the grinding operation, the workpiece being clamped by end pressure, thereby allowing the workpiece to expand evenly during the grinding operation. According to the present invention, as above pointed out, the centering fingers are removed from engagement with the workpiece when said workpiece is clamped in the chuck. Furthermore, the clamping members, which are arranged to be actuated by a draw rod, are mounted in such a manner that when the draw rod has moved the clamping jaws into clamping position, a constant clamping pressure is applied by each jaw without regard to the force exerted on the draw rod, thereby permitting actuation of the draw rod, to clamp the workpiece, by a mechanism which does not necessarily provide a constant force on said draw rod, as by a fluid under pressure.

The above and other advantageous features of the invention will appear from the following description taken in connection with the accompanying drawings in which:—

Fig. 3 is a sectional view similar to Fig. 2 showing the chuck in work-centering position.

Like reference characters refer to like parts in the different figures.

Figure 2:
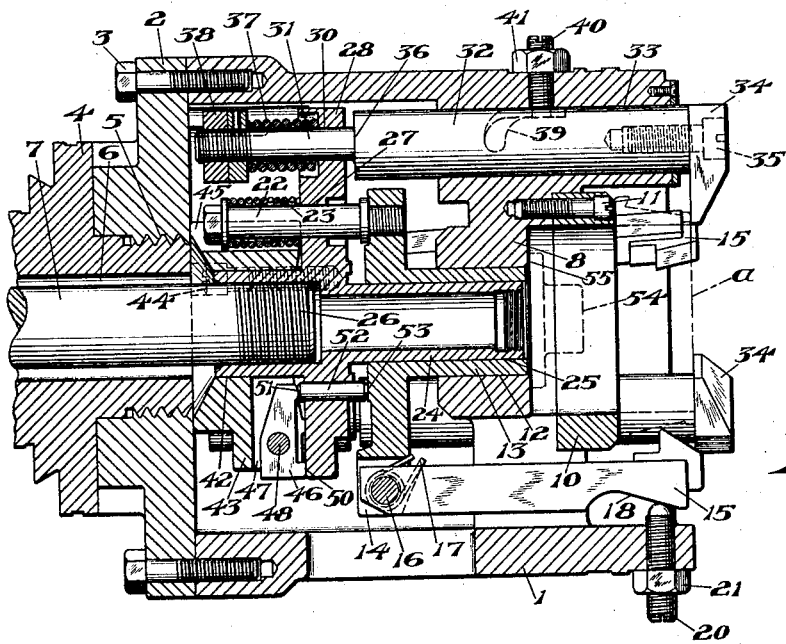
Fig. 2 is a sectional view along the line 2—2 of Fig. 1 showing the chuck in clamping position.
Figure 1:
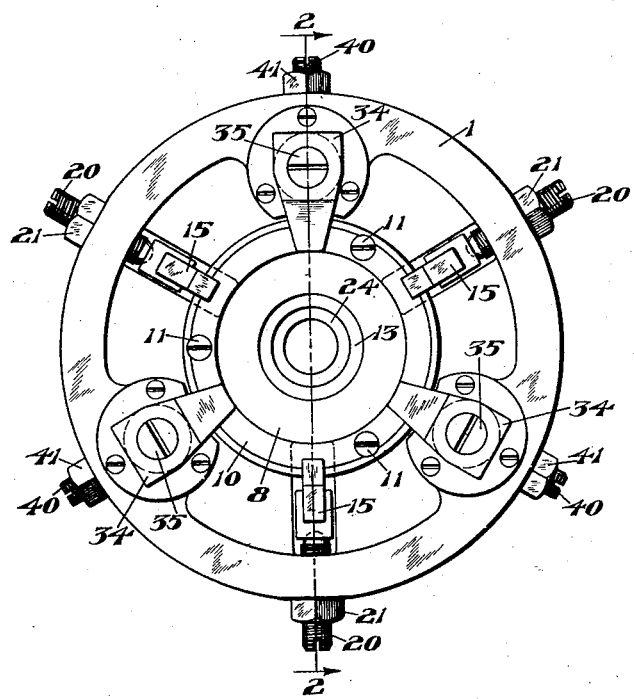
Fig. 1 is a front elevation of a work-holding device embodying the invention.

Referring to the drawings, a set of work-centering fingers and a set of clamping jaws, together with their operating devices are enclosed in a cylindrical shell or casing 1. The latter is fastened at its inner end to a face plate 2 by means of screws 3; and the face plate 2 is secured to a work-rotating spindle 4 for rotation therewith by cooperating screw threads 5 on the plate and spindle. The spindle 4 is provided with an axial bore 6 to receive, and to support for longitudinal movement therein, a draw rod 7, the latter being adapted, on movement to the right, to open the chuck for release of the workpiece from the fingers and the clamping jaws, and, upon movement to the left, to close the chuck to clamp the workpiece therein. The draw rod 7 may be actuated in any suitable manner, as by fluid under pressure acting on either side of a piston, not shown, suitably connected to said rod.

The shell 1 provides a substantially central hub 8, on the outer surface of which is mounted a ring shaped member 10, attached thereto as by screws 11, and having a plane outer surface which provides a solid backing for the workpiece *a* when said workpiece is clamped in the chuck. The hub 8 is provided with a central bore 12 in which to receive, for axial movement therein, a slidably mounted member 13, the latter having a plurality of radially projecting ears 14, three in the construction shown, for the pivotal mounting of work-centering fingers 15. Each ear 14 supports one of said work-centering fingers 15 at one end thereof on a pivot pin 16 passing through said ear and the end of said finger. Each finger 15 is forked where the pivot pin 16 passes through it and the free end of said finger is urged outwardly away from the axis of the chuck by a short coil spring 17 which surrounds the pin, one end of the pin bearing against the member 13 and the other end bearing against the finger within the forked portion. From the pivotal support, the fingers extend outwardly axially of the chuck and each is provided at its free outer end with a cam surface 18 which engages the inner end of one of a series of set screws 20 adjustably mounted in the shell 1. The position of the work-engaging portions of the centering fingers may be varied radially, in order to position the fingers in desired relation to the workpiece, by adjustment of the set screws 20, said screws being held in adjusted position by lock nuts 21. A plurality of stud bolts 22, each having a coil spring 23 mounted thereon, extend inwardly axially of the chuck from the member 13 for purposes which will hereinafter appear.

A member 24 is received in a bore 25 of the member 13 for axial sliding movement therein, and is rigidly connected to the end of the draw rod 7, as by cooperating screw threads 26. The slidable member 24 has apertures 27 through which the shanks of the studs 22 extend, the coil springs 23 engaging the heads of the stud bolts and the inner side of member 24 thereby holding the member 13 resiliently in engagement with the member 24, so that said members 13 and 24 normally move together as a unit during movement of the draw rod 7. The slidable member 24 is provided with ears 28, each ear having an aperture 30 therein within which the reduced portion 31 of one of the clamping jaw plungers 32 is slidably received.

Each jaw plunger 32 is mounted for axial movement in bearings 33 provided by the shell 1 and is provided at its outer end with jaw members 34 secured to the end of the plunger by screws 35 and extending angularly thereto. A shoulder 36, formed by the reduction in diameter of each jaw plunger, is held against the outer or right hand side of the slidable member 24 by a spring 37 which encircles the reduced end portion 31 of said jaw plunger on the inner side of said member 24, the compression of the springs being maintained by an adjustable collar 38 carried on the inner end of said reduced portion.

Figure 4:
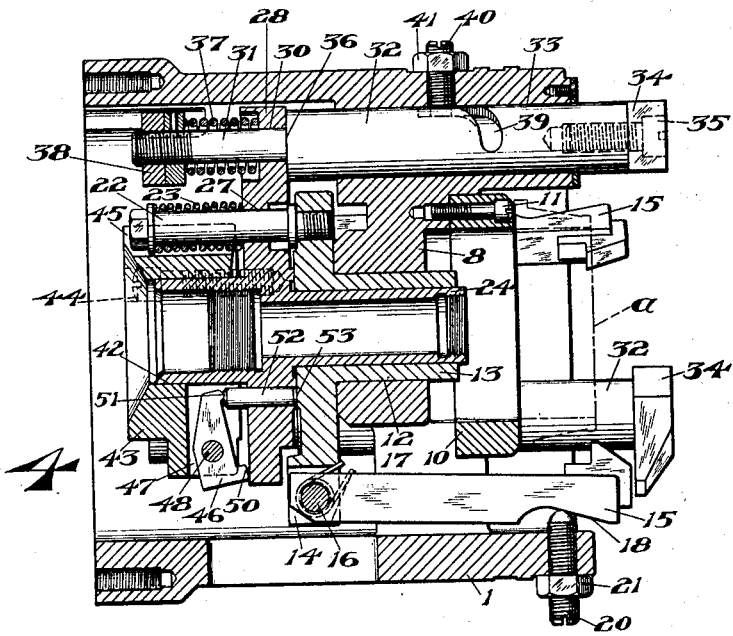
Fig. 4 is a sectional view similar to Fig. 2 showing the clamping and centering fingers out of engagement with the workpiece to permit removal of said workpiece.
Figure 5:
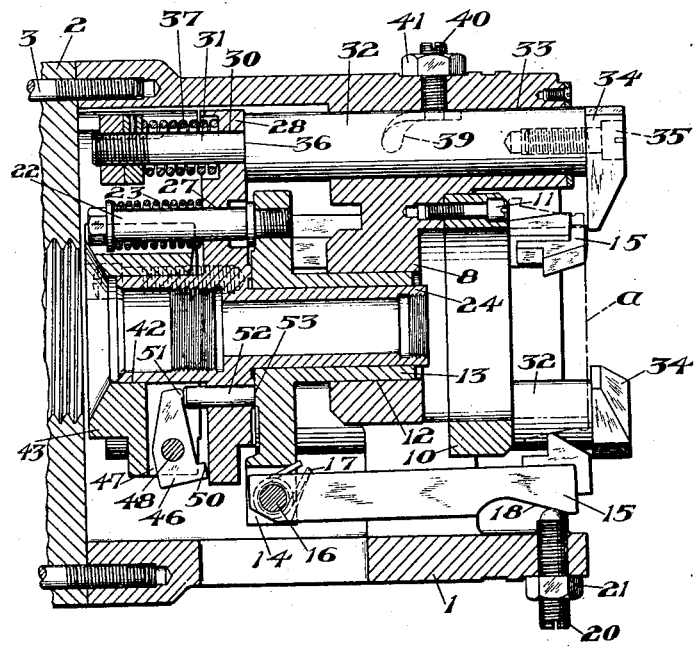

Movement of the slidable member 24 inwardly of the chuck in response to inward movement of the draw rod 7 moves the clamping jaws from the inoperative position of Fig. 4 into the clamping position of Fig. 2 by axial inward movement of the jaw plungers. During this inward movement, the plungers are rotated in order to swing the clamping jaws from the inoperative position of Fig. 4 into a position for engaging the surface of the workpiece, Fig. 2. To procure this movement a substantially helical cam 39 is provided in the surface of each plunger, and is engaged by the inner end of one of a series of studs 40, mounted in the shell 1 and held in position by lock nuts 41, so that during inward movement of the plunger, engagement of said stud with the cam procures rotary movement of said plunger. A portion of the member 24 extends over the end of the draw rod 7 and provides a cylindrical bearing surface 42 on which an annular member 43 is slidably mounted, said member 43 being held loosely in position by a screw 44. Arcuate depressions 45 are provided in the annular member 43 to avoid engagement of said member with the stud bolts 22, thereby to allow free axial movement of said annular member along the bearing surface 42. A lever 46 is pivotally supported in a slot 47 in said annular member 43 by a pivot pin 48; one end 50 of said lever abuts the inner surface of the member 24 and the other end 51 engages a pin 52 slidable axially in the member 24, said pin 52 abutting a surface 53 on the inner side of the member 13. It will be seen that sliding movement of the annular member 43 axially of the member 24 toward the right, rocks the lever 46, pressing the pin 52 to the right, thereby to procure a separation of the members 13 and 24 against the pressure of the springs 23.

In setting up the chuck so that the centering fingers will contact the workpiece with sufficient pressure to centralize the same, a member 54, Fig. 2, is threaded into the outer end of the member 24. Movement of the draw rod inwardly, with the member 54 in position, moves the member 24 until a flange on the member 54 contacts with a surface 55 provided by the hub 8 in which position the outer end of the member 24 is in the plane of said surface. With the chuck in this position, the free ends of the fingers 15 are adjusted radially by the set screws 20 to bring the work-engaging portions of said fingers into engagement with the workpiece to hold said workpiece so that the bore therein is concentric with the axis of the chuck. After the fingers are thus properly adjusted the member 54 is removed and the chuck is ready for use.

The chuck is operated to clamp or release a workpiece $a$ by movement of the draw rod 7, movement of said rod to the left or inwardly of the chuck acting to clamp the workpiece, and movement of the rod to the right or outwardly acting to release the clamping jaws from the workpiece. The positions of Figs. 4, 3 and 2 show respectively consecutive positions of the centering and clamping members during inward movement of the draw rod 7, Fig. 4 showing the chuck in open position and Fig. 2 inclosed or clamping position. In the position shown in Fig. 4, the draw rod is moved to its extreme outward or right hand position, so that the clamping jaws are rotated out of normal clamping position, and the centering fingers are withdrawn radially from normal centering position to permit insertion of a workpiece. With the chuck in this position, the workpiece $a$ is inserted so that the inner surface of said workpiece is in engagement with the outer plane surface of the ring 10 against which the workpiece is to be clamped by subsequent inward movement of the draw rod. During the initial movement of the draw rod 7 to the left, from the position of Fig. 4 to the position of Fig. 3, the member 13 moves as a unit with the member 24 so that the centering fingers mounted on member 13 are urged into engagement with the periphery of the workpiece by the engagement of the cam surface 18 with the inner end of the adjustable screw 20. Since the springs 23 resiliently hold the members 24 and 13 together the centering fingers are resiliently urged against the workpiece, the movement of member 13 relative to the draw rod being controlled by said springs 23. When the device has reached the position of Fig. 3 during the clamping movement, the centering fingers are resiliently in engagement with the workpiece with sufficient pressure to center said workpiece, and the jaws 34 are spaced to a slight extent from the surface of the workpiece against which they are adapted to clamp, said jaws having been rotated, during the initial movement of draw rod 7, from the inoperative position of Fig. 4 into alignment with the surface of the workpiece against which said jaws are adapted to clamp. It will be seen that the inner surface of the annular member 42 is spaced from the surface of the face plate 2 in this position (Fig. 3) a distance substantially equal to the spacing of the jaw members from the workpiece. Continued inward movement of the draw rod 7 beyond the position of Fig. 3 brings the clamping jaws into engagement with the surface of the workpiece with sufficient pressure to hold the workpiece in position against sliding movement, and moves the annular member 42 into engagement with the surface of the face plate, the centering fingers being resiliently maintained against the workpiece by compression of the springs 23. After the annular member 42 contacts the face plate, continued inward movement of the draw rod 7 procures sliding movement of the member 24 within the annular member 42 since further movement of said member 42 is prevented by the engagement of said member with the face plate. The relative sliding movement of members 24 and 42, following engagement of said member 42 with the face plate causes said members to approach each other, thereby rocking the lever 44 pivoted on member 42 and exerting a thrust on the pin 48 toward the right whereby the member 13 is urged outwardly of the chuck against the action of the springs 23, the centering fingers being urged outwardly therewith and out of engagement with the workpiece. During this latter inward movement of the draw rod, the inner side surface of the member 24 is brought into engagement with the annular member 42 (which is held against movement by engagement with the face plate 2) so that further inward movement of the draw rod is prevented, and the member 24 is held in fixed position within the chuck regardless of the tension exerted on the draw rod, sufficient tension being maintained to hold said member 24 in position against the annular member 42. During the same latter inward movement of the draw rod, the clamping jaws have been moved into secure clamping engagement with the workpiece, the pressure exerted by each clamping jaw being constant, when the movement of the draw rod is discontinued, said pressure being determined by the amount of compression of the springs 37 which latter may be varied, as above pointed out, by adjustment of the collars 38. It will be seen that the inward movement of the member 24, against which the springs 37 rest, is somewhat greater than the inward movement of said jaw members, so that after engagement of the jaws with the workpiece, continued movement of the member 24 compresses springs 37 and increases the tension on each jaw member. Outward or right hand movement of the draw rod 7 releases the chuck in the reverse manner.

From the above, it will be apparent that the draw rod may be actuated by any desirable means, and that, while the chuck is in the position of Fig. 2, in which the jaws are clamping the workpiece, the clamping pressure exerted by each jaw is constant as determined by springs 37 without regard to the amount of pull on the draw rod. Furthermore, with the chuck in this position, the centering fingers are entirely out of engagement with the workpiece, avoiding any tendency of the workpiece to be distorted by the pressure of said fingers. The centering fingers are returned to the normal position for centering a successive workpiece, during the movement of the draw rod to the right, the springs 23 returning the members 13 and 24 to the normal position of Fig. 4.

We claim:

1. In a chuck, an operating rod, a set of pivotally mounted work-centering fingers, said fingers being urged together when said rod is being drawn inwardly of the chuck, and means responsive to further inward movement of said rod to procure separation of said fingers.

2. In a chuck, an operating rod, a set of pivotally mounted work-centering fingers, means to urge said fingers together in response to initial movement of said rod, and means to urge said fingers away from each other in response to further movement of said rod in the same direction.

3. In a chuck, an operating rod, a set of pivotally mounted work-centering fingers, means to urge said fingers resiliently together in response to initial movement of said rod inwardly of the chuck, and means to urge said fingers positively away from each other in response to futher inward movement of said rod.

4. In a chuck, an operating rod, a set of work-centering members, a set of work-clamping members, means to urge said centering members together and simultaneously to urge said clamping members into clamping position in response to movement of said rod, and means to urge said centering members away from each other, and to clamp said work-clamping members securely against a workpiece in response to further movement of said rod.

5. In a chuck, an operating rod, a series of work-clamping members, means responsive to movement of said rod to urge said members into clamping engagement with a workpiece, and means to procure a constant clamping pressure for each member regardless of the tension on the operating rod.

6. In a chuck, an operating rod, a series of work-clamping members, means responsive to movement of said rod to urge said members into clamping engagement with a workpiece, said members being held in clamping position by the tension on the rod, and means to procure a constant clamping pressure for each member regardless of the tension on the operating rod.

7. In a chuck, an operating rod, a series of work-clamping members, means responsive to movement of said rod to urge said members into clamping engagement with a workpiece, said members being held in clamping engagement by the tension on the rod, and means to limit positively the inward movement of said rod whereby to procure a constant clamping pressure for each member regardless of the tension on the operating rod.

8. In a chuck, an operating rod, a set of work-centering members, a set of work-clamping members, means to urge said centering members together and simultaneously to urge said clamping members into clamping position in response to movement of said rod, means to urge said centering members away from each other and to clamp said work-clamping members securely against the workpiece in response to further movement of said rod, and means to limit positively the inward movement of said rod whereby the work-clamping members exert a constant clamping pressure on said workpiece regardless of the tension on the rod.

9. In a chuck, an operating rod, a plurality of jaw members arranged to clamp against the face of a workpiece, means responsive to movement of said rod to rotate said jaw members about an axis parallel to the axis of the chuck and into clamping position and to move said jaw members axially of the chuck to bring said members into secure clamping relation to the workpiece, and means to limit positively the movement of said rod whereby to procure a constant clamping pressure for each jaw member regardless of the tension on said rod.

10. In a chuck, an operating member, a set of pivotally mounted work-centering fingers, means responsive to movement of said operating member to urge said fingers radially into engagement with a workpiece in the chuck, and means responsive to further movement of the operating member in the same direction to withdraw said fingers from engagement with the workpiece.

D. C. PAGE.
G. D. SCOTT.